(12) United States Patent
Mizuuchi

(10) Patent No.: US 7,426,223 B2
(45) Date of Patent: Sep. 16, 2008

(54) COHERENT LIGHT SOURCE AND OPTICAL DEVICE

(75) Inventor: Kiminori Mizuuchi, Osaka (JP)

(73) Assignee: Matsushita Electric Industrial, Co., Ltd., Osaka (JP)

( * ) Notice: Subject to any disclaimer, the term of this patent is extended or adjusted under 35 U.S.C. 154(b) by 179 days.

(21) Appl. No.: 10/576,210

(22) PCT Filed: Mar. 15, 2005

(86) PCT No.: PCT/JP2005/004525

§ 371 (c)(1),
(2), (4) Date: Apr. 17, 2006

(87) PCT Pub. No.: WO2005/098529

PCT Pub. Date: Oct. 20, 2005

(65) Prior Publication Data

US 2007/0053388 A1    Mar. 8, 2007

(30) Foreign Application Priority Data

Apr. 9, 2004   (JP)   ............................. 2004-115278

(51) Int. Cl.
*H01S 3/10* (2006.01)
(52) U.S. Cl. .......................................... 372/21; 372/22
(58) Field of Classification Search .................. 372/22, 372/21
See application file for complete search history.

(56) References Cited

U.S. PATENT DOCUMENTS

| 5,448,398 | A | 9/1995 | Asakura et al. | |
|---|---|---|---|---|
| 5,936,985 | A | 8/1999 | Yamamoto et al. | |
| 6,195,198 | B1 | 2/2001 | Hatori | |
| 6,763,042 | B2 * | 7/2004 | Williams et al. | 372/6 |
| 6,845,113 | B2 * | 1/2005 | Kitaoka et al. | 372/22 |
| 2001/0022566 | A1 | 9/2001 | Okazaki | |
| 2002/0001322 | A1 | 1/2002 | Yamamoto et al. | |
| 2002/0009102 | A1 * | 1/2002 | Hayakawa | 372/22 |
| 2002/0126369 | A1 | 9/2002 | Yamamoto et al. | |
| 2002/0172488 | A1 | 11/2002 | Morikawa et al. | |
| 2003/0226834 | A1 | 12/2003 | Ishikawa et al. | |
| 2004/0027648 | A1 * | 2/2004 | Furukawa et al. | 359/328 |
| 2004/0120647 | A1 * | 6/2004 | Sakata et al. | 385/39 |

FOREIGN PATENT DOCUMENTS

| EP | 0 709 649 | 3/1996 |
|---|---|---|
| EP | 1 096 307 | 5/2001 |
| JP | 4-45478 | 2/1992 |
| JP | 6-102552 | 4/1994 |
| JP | 10-186427 | 7/1998 |
| JP | 2001-264662 | 9/2001 |

(Continued)

*Primary Examiner*—Dung T Nguyen
(74) *Attorney, Agent, or Firm*—Wenderoth, Lind & Ponack, L.L.P.

(57) ABSTRACT

It is easy to increase output with a wide stripe laser, but the lateral mode is a multimode, and the coupling efficiency is low with a single-mode fiber or a single-mode waveguide, creating problems in terms of increasing output. To solve these problems, the light emitted from a wide stripe semiconductor laser is passed through a mode converter and a wavelength selecting filter, then fed back to the active layer of the semiconductor laser, which fixes the oscillation mode of the semiconductor laser to single mode.

21 Claims, 4 Drawing Sheets

FOREIGN PATENT DOCUMENTS

| | | |
|---|---|---|
| JP | 2001-308454 | 11/2001 |
| JP | 2001-318396 | 11/2001 |
| JP | 2003-43536 | 2/2003 |
| JP | 2003-140213 | 5/2003 |
| JP | 2003-163400 | 6/2003 |
| JP | 2004-35987 | 2/2004 |
| JP | 2004-102226 | 4/2004 |
| WO | 96/38757 | 12/1996 |

* cited by examiner transmission characteristics of band pass filter

COHERENT LIGHT SOURCE AND OPTICAL DEVICE

TECHNICAL FIELD

The present invention relates to a coherent light source that makes use of a wavelength conversion element, and to an optical device.

BACKGROUND ART

Wavelength conversion elements featuring a semiconductor laser can be made smaller and have higher output, and the wavelength can be shortened by utilizing wavelength conversion to a higher harmonic wave. On the other hand, the wavelength tolerance for a wavelength conversion element to convert wavelengths at high efficiency is generally extremely narrow, which means that the oscillation wavelength of the semiconductor laser has to be stabilized to stabilize the output.

Providing optical feedback to the semiconductor laser has been proposed as a way to solve this problem. The waveguide mode of a semiconductor laser can be controlled by external optical feedback. For instance, it has been indicated that the oscillation wavelength of a semiconductor laser can be fixed by using a narrow-band wavelength selecting filter or a fiber grating to subject light emitted from a semiconductor laser to wavelength selection, and then providing feedback to the resonator of the semiconductor laser (see Patent Document 1, for example). There has also been proposed a method for controlling the oscillation wavelength of a semiconductor laser by using an external grating to return light from the outside (see Patent Document 2, for example).

FIG. 8 shows an example of a conventional coherent light source. A band pass filter 504 is used to provide optical feedback to a semiconductor laser 501, and the oscillation wavelength of the semiconductor laser is fixed at the transmission wavelength of the band pass filter 504. A dichroic mirror 505 has the characteristics of completely reflecting higher harmonic waves and transmitting fundamental waves, and the band pass filter 504 is designed to transmit only a fundamental wave of a selected wavelength. A fundamental wave that exits the semiconductor laser 501 is focused by a focusing optical system 502 and is incident on a wavelength conversion element 503. Part of the fundamental wave is converted into a higher harmonic wave by the wavelength conversion element 503, and after passing through a coherent lens, the higher harmonic wave is subjected to wavelength separation by the dichroic mirror 505 and taken off to the outside as a higher harmonic wave. Meanwhile, the fundamental wave emitted from the wavelength conversion element passes through the coherent lens 510, then passes through the dichroic mirror 505, and is selected for a specific wavelength by the band pass filter 504. After this, the fundamental wave is reflected by a mirror 513, goes back along the same path, and is fed back into the active layer of the semiconductor laser 501. Since the power of the feedback wavelength is increased within the active layer of the semiconductor laser 501, there is an apparent decrease in the loss of light of the feedback wavelength within the resonator, so the oscillation wavelength is fixed at the feedback wavelength. Since the transmission wavelength can be controlled by adjusting the angle of the band pass filter 504, it is possible to perform wavelength conversion very efficiently by adjusting the oscillation wavelength of the semiconductor laser to the phase matching wavelength of the wavelength conversion element 503.

Patent Document 1: Japanese Unexamined Patent Publication H10-186427

Patent Document 2: Japanese Unexamined Patent Publication H06-102552

DISCLOSURE OF THE INVENTION

Nevertheless, problems with the above conventional methods were that they entailed so many optical components, and the optical system was complicated, making it difficult to stabilize an optical system and reduce its size. Furthermore, since the optical axis at which a higher harmonic wave was generated was at an angle to the optical axis of the fundamental wave incident light, another problem was difficulty in adjusting the optical axis.

One method for providing feedback is to insert a band pass filter at the place where the semiconductor laser is coupled to the wavelength conversion element, which results in a more compact size. With this method, though, there is a decrease of over 20% in the fundamental wave whose wavelength is converted, and the output of higher harmonic waves decreases by more than 40%, which poses problems in terms of raising output.

In view of this, the coherent light source of the present invention comprises a light source, a wavelength conversion element that converts part of a fundamental wave emitted from the light source into a higher harmonic wave, and a wavelength selecting filter that has narrow-band transmission characteristics with respect to the part of the fundamental wave not converted into the higher harmonic wave, and has transmission characteristics with respect to the higher harmonic wave. The part of the fundamental wave emitted from the wavelength conversion element but not converted into the higher harmonic wave is fed back to the light source by the wavelength selecting filter, and the higher harmonic wave is emitted to the outside after passing through the wavelength selecting filter. This affords a short-wavelength light source that has high output and is stable, and is extremely well suited to mass production.

In the coherent light source of the present invention, the wavelength selecting filter has a band pass filter and a dichroic mirror. The band pass filter has narrow-band transmission characteristics with respect to the part of the fundamental wave not converted into the higher harmonic wave, and has transmission characteristics with respect to the higher harmonic wave. The dichroic mirror reflects the part of the fundamental wave transmitted by the band pass filter but not converted into the higher harmonic wave, and the higher harmonic wave passes through the band pass filter and then passes through the dichroic mirror and is emitted to the outside. This makes it possible to simplify an optical system, which affords a more compact size and greater stability.

In the coherent light source of the present invention, the wavelength selecting filter is a confocal optical system, and the dichroic mirror is installed in the focal plane of the confocal optical system. This stabilizes the fundamental wave before it is fed back to the semiconductor laser.

In the coherent light source of the present invention, the light source is a single-mode semiconductor laser. This improves the focusing characteristics and conversion efficiency.

It is preferable if the cavity length of the semiconductor laser is 1 mm or more. This makes it easier to match the wavelength of the semiconductor laser to the phase matching wavelength.

It is also preferable if the semiconductor laser has undergone high-frequency superposition. This stabilizes the output.

In the coherent light source of the present invention, the light source may be a fiber laser.

In the coherent light source of the present invention, the transmissivity of the higher harmonic wave of the wavelength selecting filter is preferably 80% or more. This minimizes the decrease in output.

It is also preferable if the selected wavelength width of the wavelength selecting filter is 0.2 nm or less. This minimizes the decrease in conversion efficiency.

In the coherent light source of the present invention, the wavelength conversion element is furnished with a periodic polarization inversion structure. This makes more efficient conversion possible.

At least one of the end faces of the wavelength conversion element is preferably inclined at an angle of 3° or more with respect to the optical axis of the wavelength conversion element. This minimizes noise and output instability.

The coherent light source of the present invention further comprises a focusing optical system between the light source and the wavelength conversion element, wherein the focusing optical system has chromatic aberration, and focuses the higher harmonic wave and the part of the fundamental wave not converted to the higher harmonic wave at different focal points. This affords a higher-performance coherent light source.

Also, the wavelength conversion element is furnished with an optical waveguide. This makes more efficient conversion possible.

Further, the wavelength conversion element is directly coupled to the light source. This allows the light source to be more compact in size.

In the coherent light source of the present invention, the wavelength selecting filter is installed on an end face or in the interior of the optical waveguide. This affords a more compact size.

In the coherent light source of the present invention, the wavelength conversion element is furnished with an optical waveguide. The wavelength selecting filter has a band pass filter installed on an end face or in the interior of the optical waveguide, and a dichroic mirror installed on an end face of the optical waveguide. The band pass filter has narrow-band transmission characteristics with respect to the part of the fundamental wave not converted into the higher harmonic wave, and has transmission characteristics with respect to the higher harmonic wave. The dichroic mirror reflects the part of the fundamental wave transmitted by the band pass filter but not converted into the higher harmonic wave, and the higher harmonic wave passes through the band pass filter and then passes through the dichroic mirror and is emitted to the outside. All of this affords a more compact size.

The thickness of the dichroic mirror is preferably 1 mm or more. This minimizes the attraction of dust.

The optical device of the present invention has a coherent light source and an image conversion optical system, wherein the light from the coherent light source is converted into a two-dimensional image by the optical system.

Preferably, the image conversion optical system comprises a two-dimensional beam scanning optical system.

Preferably, the image conversion optical system comprises a two-dimensional switch.

The "image conversion optical system" referred to here is constituted by a two-dimensional or one-dimensional optical switch. Two-dimensional switches include transmissive and reflective liquid crystal switches, and movable micromirrors (DMD) that utilize semiconductor micromachines. These are used as image conversion elements in projectors to subject the lamp light to image conversion.

By endowing a wavelength selecting filter with higher harmonic wave transmission characteristics as above, an optical system can be simplified, made more compact, and stabilized. Also, the optical system itself can be developed for direct coupling systems that are much smaller in size. This in turn affords a short-wavelength light source that has high output and is stable, and is extremely well suited to mass production.

Figure 1:
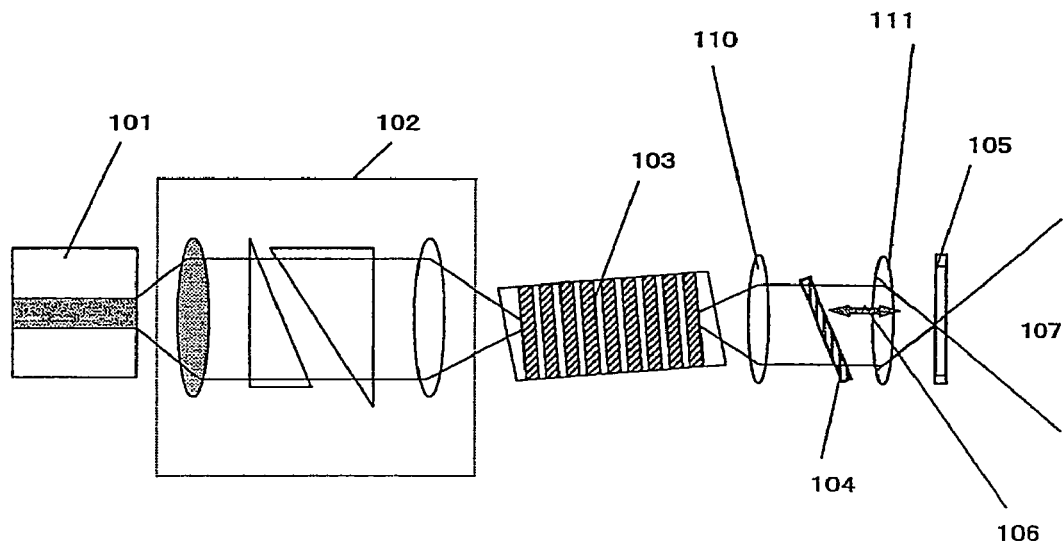
FIG. 1 is a diagram of the structure of the coherent light source pertaining to Embodiment 1 of the present invention.

NUMERICAL REFERENCE 101, 201, 301, 501 semiconductor laser
102, 202, 502 focusing optical system
103, 203, 308, 503 wavelength conversion element
104, 204, 304, 504 band pass filter
105, 205, 306, 505 dichroic mirror
106, 206 fundamental wave
107, 207, 305, 307, 512 higher harmonic wave
110, 210, 310, 510 coherent lens
111, 211, 311, 511 focusing lens
208, 303 polarization inversion
209, 302 optical waveguide
513, 902, 903 mirror
801, 901 light source
802 two-dimensional switch
803 prism
804 lens
805 RGB laser
807 diffraction element
904 laser beam
905 screen

DESCRIPTION OF THE PREFERRED EMBODIMENTS

The present invention is a method for fixing the wavelength of a semiconductor laser by optical feedback in a coherent light source consisting of a semiconductor laser and a wavelength conversion element. The characteristics of a wavelength selecting filter are controlled, and higher harmonic wave transmission characteristics are imparted, which solves the problems encountered in the past and results in a coherent light source that is smaller and has higher output.

The coherent light source of the present invention will now be described.

First Embodiment

FIG. 1 shows an example of the structure of the coherent light source of the present invention. In the example shown here, a wavelength selecting filter is constituted by a band pass filter and a dichroic mirror. The wavelength selecting filter is a confocal optical system, and the dichroic mirror is installed in the focal plane of the confocal optical system. The coherent light source comprises a semiconductor laser 101, a focusing optical system 102, a wavelength conversion element 103, a collimating lens 110, a band pass filter 104, a focusing lens 111, and a dichroic mirror 105.

The band pass filter 104 is composed of a dielectric multilayer film, and transmits only certain wavelengths with respect to the fundamental wave of the semiconductor laser 101. This will be described in further detail below. The dichroic mirror 105 is designed so as to reflect fundamental waves and transmit at least 95% of higher harmonic waves.

Next, the coherent light source of the present invention and the principle thereof will be described. A fundamental wave emitted from the wavelength conversion element 103 is focused by the focusing optical system 102. Part of the fundamental wave focused by the wavelength conversion element 103 is converted into a higher harmonic wave. A light source with a wavelength of 980 nm and an output of 500 mW will be used as an example of the semiconductor laser 101. The wavelength conversion element 103 here is magnesium-doped $LiNbO_3$, featuring a periodic polarization inversion structure. With this wavelength conversion element 103, the polarization inversion period is 5.4 μm and the conversion efficiency is about 5%, and the fundamental wave can be converted into a second harmonic wave with a wavelength of 490 nm. The higher harmonic wave produced by this wavelength conversion is made into parallel light by the collimating lens 110, after which it is transmitted by the band pass filter 104, and is outputted to the outside through the focusing lens 111 and the band pass filter 104. Meanwhile, the fundamental wave is focused on the mirror face of the dichroic mirror 105 by the focusing lens 111. The fundamental wave reflected by the dichroic mirror 105 goes back along the same path and is fed back to the active layer of the semiconductor laser 101. Since the optical system is a confocal optical system, the fundamental wave is stably fed back to the semiconductor laser 101. An anti-reflection film (with respect to the fundamental wave) is formed on the incident face and reflection face of the wavelength conversion element 103, and the design is such that light along the way will not be fed back to the semiconductor laser 101 and become a source of noise or output instability. The entry and exit faces of the wavelength conversion element 103 are formed at an angle to the optical axis of the element (an axis perpendicular to the polarization inversion). This also serves to prevent reflected light at an end face from being fed back to the semiconductor laser 101. When the dichroic mirror 105 is used, the optical system becomes confocal, linking the focal point in the reflecting mirror face, so there is greater tolerance in the optical system and a more stable system can be achieved.

The optical system of the present invention has the following advantages.

First, there are fewer components involved. Using a transmission type of band pass filter allows the dichroic mirror to be utilized as a fundamental wave reflecting mirror and a wavelength separating mirror, which reduces the number of components needed. This eliminates a band pass mirror from the collimation system, and greatly reduces the volume of the optical system. As a result, the coherent light source can be simpler and more compact, and another advantage is that the stability of the optical system can be greatly enhanced.

Second, the optical system is linear. Since the incident fundamental wave and the emitted higher harmonic wave are in a linear optical system, the optical system is easier to design. Furthermore, assembly of the parts is easier, less assembly precision is required, the production steps are simpler, and assembly is faster, all of which contributes to mass production.

Third, the optical system is a divergent system. Unlike with conventional optical systems, the emitted higher harmonic wave is divergent light. Since collimated light was used in the past, a lens system had to be added to match the beam diameter to the optical system being used. In contrast, an advantage to a divergent optical system is that adjustment of the beam diameter can be easily accomplished with a single suitable lens. This makes it easier to design the optical system.

The mirror face of the dichroic mirror 105 is preferably formed on the focusing side. This is because if the power density of the light is high, it has been observed that dust accumulates around the edges by an optical trapping effect, which compromises the characteristics. Optical trapping occurs on the light emission side, and depends on the power density. To prevent this, the power density is preferably kept as low as possible at the exit face. Accordingly, the mirror face is installed on the inside to reduce the power density at the exit face. Increasing the thickness of the substrate of the dichroic mirror 105 is also effective. If the substrate thickness is 1 mm or more, the power density of the higher harmonic wave will be reduced at the exit end face, so less dust will be trapped. A block, prism, or the like can also be applied as the substrate of the dichroic mirror 105.

Putting the mirror face on the inside is also effect at reducing aberration. If the mirror face is installed on the exit side, focused light will be transmitted through the substrate of the dichroic mirror 105, so aberration increases. The fundamental wave reflected by the dichroic mirror 105 is fed back to the active layer of the semiconductor laser 101. The active layer has a shape on the micron order, and the occurrence of aberration is linked to a reduction in the amount of feedback light, and increases output instability. Installing the mirror face on the focusing side is also preferable in terms of preventing this.

The semiconductor laser 101 used here is preferably a single-mode type. This is necessary to improve the efficiency of coupling with the optical waveguide when an optical waveguide is used. Even when used in bulk, the semiconductor laser 101 will have poor focusing characteristics and conversion efficiency will decrease if a multimode type is used.

Since the wavelength conversion element 103 here is assumed to a bulk type, beam shaping with a prism pair is used as the focusing optical system. With a bulk type, higher efficiency can be attained by shaping the output from the semiconductor laser 101, which is an elliptical beam, into a circular beam.

Figure 2:
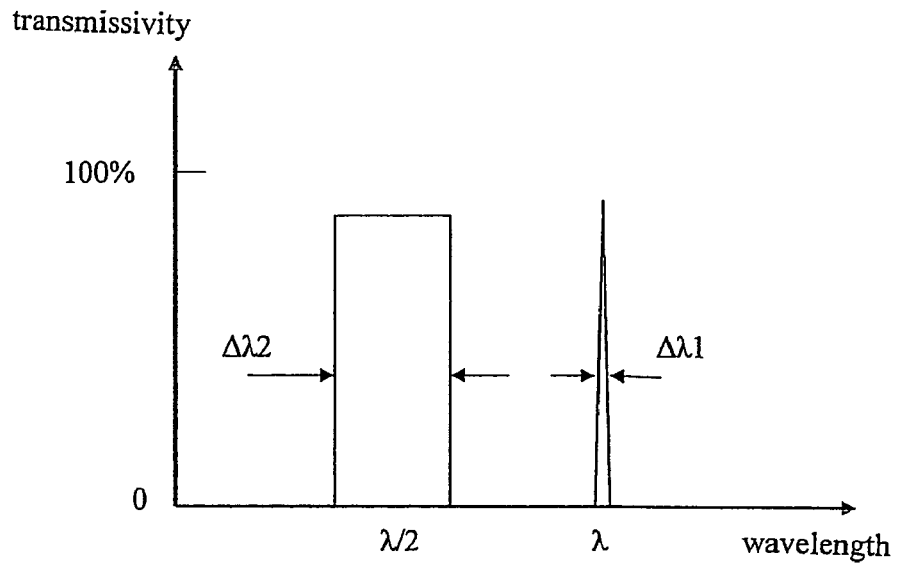
FIG. 2 is a graph of the transmission characteristics of a band pass filter.

FIG. 2 shows the transmission characteristics of the band pass filter 104. The band pass filter 104 has sharp transmission characteristics with a narrow half band width in the vicinity of the phase matching wavelength λ of the wavelength conversion element 103. The half band width Δλ1 of the transmission wavelength of the band pass filter 104 is preferably 0.6 nm or less. This depends on the wavelength tolerance of the wavelength conversion element 103, but the tolerance of the wavelength that can be converted by the wavelength conversion element is generally about 0.1 nm. Accordingly, if the wavelength of the band pass filter is over 1 nm, it will far exceed the tolerance of the wavelength conversion element, which results in diminished conversion efficiency. To prevent this, the width of the fundamental wave transmission wavelength of the band pass filter 104 is preferably 0.6 nm or less. 0.2 nm or less is even better. A width of 0.2 nm or less will yield stable output characteristics. Meanwhile, high transmissivity is required with respect to the higher harmonic wave (a wavelength of $\lambda/2$ here). The lower the transmissivity, the more output decreases, so a transmissivity of 80% is necessary at the very least. Another important point is that, as shown in the structure in FIG. 1, the band pass filter 104 adjusts the transmission wavelength of the fundamental wave, and matches the wavelength of the fundamental wave to the phase shaped wave of the wavelength conversion element 103, by varying the angle. The design must be such that the transmission characteristics of the higher harmonic wave will be maintained at 80% or higher over this entire angle adjustment range. The half band width $\Delta\lambda 2$ of the transmission wavelength near the wavelength of the higher harmonic wave is preferably 10 nm or more. The fundamental wave transmissivity of the band pass filter 104 is preferably from 30% up to 80%. If the transmissivity is too high, the focusing power density at the dichroic mirror 105 will be higher, which adversely affects the reliability of the mirror face. On the other hand, if the transmissivity is too low, there will be less feedback to the semiconductor laser, and stable optical feedback will not be realized. Since the fundamental wave passes through the band pass filter two times, if the transmissivity is 30% or less, the feedback light will be 10% or less, making it difficult to stably fix the wavelength.

The end face reflectivity of the semiconductor laser 101 is preferably 1% or less. The purpose of this is to ensure adequate optical feedback from the outside within the active layer.

The length of the active layer of the semiconductor laser 101 is preferably 1 mm or more. That is, the length of the cavity of the semiconductor laser is preferably 1 mm or more. The oscillation wavelength of the semiconductor laser 101 is determined by a compound cavity composed of the resonator of the semiconductor laser and the resonator of the external feedback, so the vertical-mode spacing is inversely proportional to the length of the active layer. Since the tolerance of the transmission wavelength of the band pass filter 104 is narrow (0.2 nm or less), if the vertical-mode spacing of the semiconductor laser 101 is narrow, there will be considerable fluctuation in the output of the semiconductor laser 101 when the angle of the band pass filter 104 is varied to control the wavelength. Also, since the phase matching wavelength tolerance of the wavelength conversion element 103 is narrow (about 0.1 nm), if the vertical-mode spacing of the semiconductor laser 101 is too wide, the problem is that it will be difficult to accurately match the wavelength of the semiconductor laser 101 to the phase matching wavelength. To prevent this, the length of the active layer of the semiconductor laser 101 must be 1 mm or more, and the vertical-mode spacing must be narrower.

The higher harmonic wave is preferably superposed in the semiconductor laser 101. This has two advantages. First, when a higher harmonic wave is superposed over the drive current of the semiconductor laser, there is a decrease in the coherence of the semiconductor laser, and the oscillation wavelength fluctuates at high speed, so on average the output is stabilized. In particular, since the wavelength conversion element 103 has a narrow tolerance, output fluctuation will occur even if the oscillation wavelength of the semiconductor laser 101 wavers at a transmission wavelength region of 0.2 nm of the band pass filter 104. Superposing the higher harmonic wave averages out the wavelength fluctuations and results in a stable output. The second advantage is higher conversion efficiency by the wavelength conversion element 103. When a higher harmonic wave is superposed, the output of the semiconductor laser 101 becomes a high-output pulse train. Since the wavelength conversion element 103 utilizes a nonlinear optical effect, the conversion efficiency depends on the peak power of the light. Therefore at a given average power, conversion efficiency will be greatly increased by employing a pulse train of high peak power.

We have discussed a semiconductor laser as the light source of the fundamental wave, but the light source is not limited to this. For instance, a solid state laser, a fiber laser, or the like can be used instead. A ytterbium-doped fiber laser allows highly efficient laser excitation having a broad absorption wavelength band, but since the oscillation wavelength is extremely wide in the case of a fiber, there is a decrease in the conversion efficiency by the wavelength conversion element. To prevent this, it is important to narrow the wavelength band by optical feedback. The present invention is also effective in a method such as this.

Second Embodiment

Figure 3:
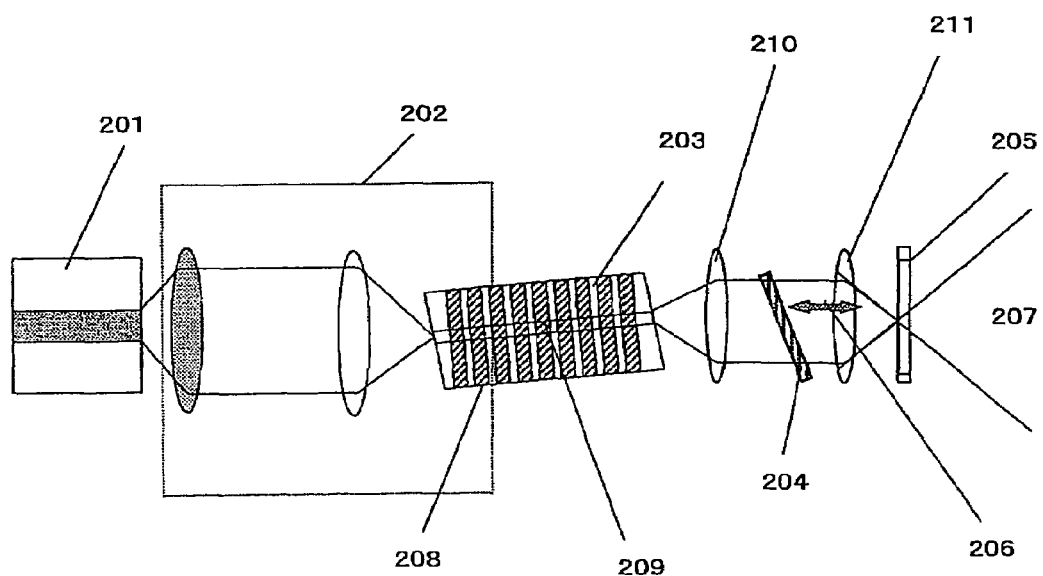
FIG. 3 is a diagram of the structure of the coherent light source pertaining to Embodiment 2 of the present invention.

We will now describe an example of applying the structure of the present invention to a wavelength conversion element that makes use of an optical waveguide. In FIG. 3, a wavelength conversion element 203 comprises a periodic polarization inverter 208 and an optical waveguide 209. The fundamental wave that exits a semiconductor laser 201 is focused on the optical waveguide 209. The fundamental wave that propagates through the optical waveguide 209 is subjected to wavelength conversion by the periodic polarization inverter 208, and becomes a higher harmonic wave. Using the optical waveguide 209 results in a high conversion efficiency of about 50%, and a 200 mW higher harmonic wave (wavelength 490 nm) is obtained from the semiconductor laser 201, which has a wavelength of 980 nm and an output of 500 mW. This constitution simplifies and stabilizes the optical system, and yields a coherent light source that is compact and stable.

Figure 4:
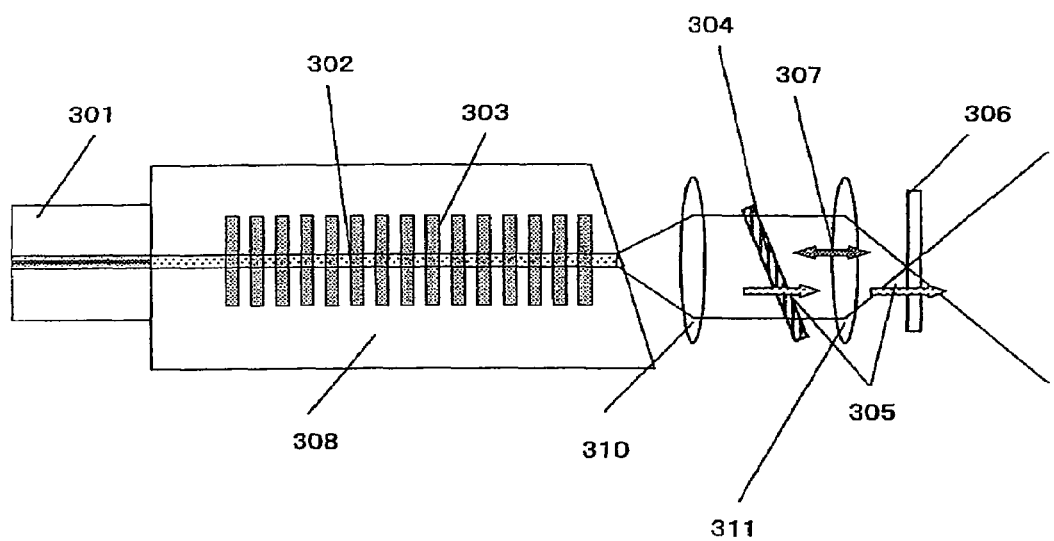
FIG. 4 is a diagram of another structure of the coherent light source pertaining to Embodiment 2 of the present invention.

Furthermore, with a waveguide type, the direct coupling type of structure shown in FIG. 4 can be obtained. The light source can be made more compact by direct coupling of a semiconductor laser 301 and a wavelength conversion element 308. The semiconductor laser 301 here is directly coupled to an optical waveguide 302. Matching the beam diameter results in a coupling efficiency of about 90%, which means that high efficiency coupling is possible. Also, the semiconductor laser 301 and the wavelength conversion element 308 can be bonded on a sub-mount, which results in an extremely short distance between elements, and allows more stable coupling. The higher harmonic wave emitted from the wavelength conversion element 308 goes through a collimating lens 310, a band pass filter 304, and a focusing lens 311 and is focused on a dichroic mirror 305. Since the dichroic mirror 305 transmits higher harmonic waves, a higher harmonic wave is outputted to the outside without being changed.

Meanwhile, a fundamental wave is subjected to wavelength selection by the band pass filter 304, after which it is reflected by the dichroic mirror 305, goes back along the same path, and is fed back to the semiconductor laser 301. The end face of the wavelength conversion element 308 on the incident side is perpendicular to the optical waveguide 302, which increases coupling efficiency with the semiconductor laser 301. The exit side, meanwhile, is ground at an angle, and the grinding angle is preferably 3° or more. This reduces the amount of light reflected at the end face to 0.1% or less, and eliminates output instability and noise produced by light returning from the end face to the semiconductor laser 301.

Also, the collimating lens 310 and the focusing lens 311 are structured so as to generate chromatic aberration with respect to the fundamental wave and higher harmonic wave. Accordingly, the focal points of the light at the dichroic mirror 306 are shifted by about the focal depth. Furthermore, the dichroic mirror 306 is installed at the focal point of the fundamental wave, and adjustment is made so that the fundamental wave will be fed back to the active layer of the semiconductor laser 301. This is because if the fundamental wave and higher harmonic wave are focused on the same point of the dichroic mirror 306, since a confocal optical system is employed, the higher harmonic wave will end up being fed back to the semiconductor laser 301, and this will be a source of noise in the semiconductor laser 301. In this example, it is possible to prevent the generation of noise by utilizing the chromatic aberration of the lens. At the same time, the power density of the light is lowered at the surface of the dichroic mirror 306 to prevent deterioration in reliability due to surface damage of the dichroic mirror 306. As to the relationship between the focal positions of the fundamental wave and the higher harmonic wave due to chromatic aberration, it is preferable for the focal point of the higher harmonic wave to be ahead of the focal point of the fundamental wave. This is because having the focal point of the higher harmonic wave ahead of the dichroic mirror 306 reduces the power density of the higher harmonic wave at the exit face of the dichroic mirror, so the optical trapping effect results in less end face adhesion.

Figure 5A:
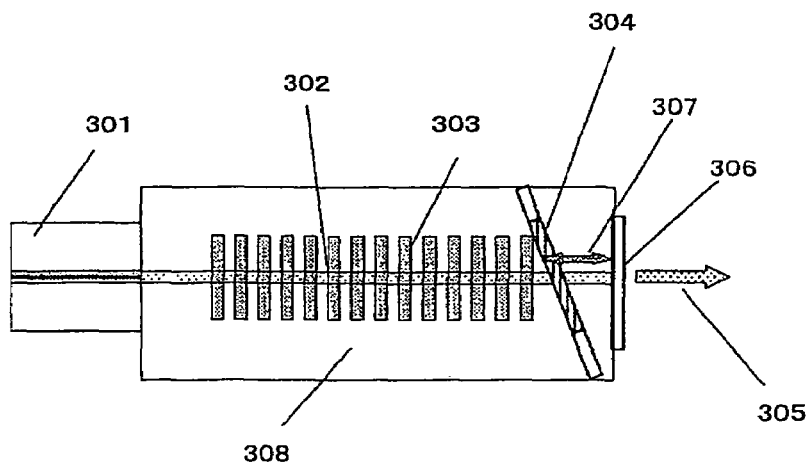
FIG. 5 is a diagram of another structure of the coherent light source pertaining to Embodiment 2 of the present invention.
Figure 5B:
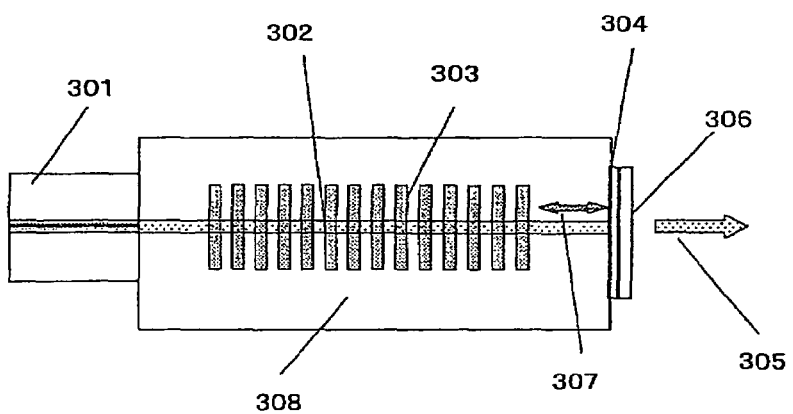

A structure that results in more compact integration will be described through reference to FIG. 5. In FIG. 5a, the band pass filter 304 is fitted into a groove formed along the waveguide. The dichroic mirror 306 is installed at the exit end face of the waveguide, and reflects fundamental waves and transmits higher harmonic waves. A fundamental wave reflected by the dichroic mirror 306 is fed back through the waveguide to the semiconductor laser 301, and the oscillation wavelength is fixed at the transmission wavelength of the filter. In FIG. 5b, the band pass filter 304 and the dichroic mirror 306 have been deposited on the waveguide end face. Integrating the wavelength selecting filter into the waveguide makes possible an extremely compact light source. When the band pass filter 304 is integrated, it is difficult to adjust the oscillation wavelength of the semiconductor laser by adjusting the angle of the filter, but in this case the phase matching wavelength can be controlled, and the phase matching wavelength matched to the transmission wavelength of the filter, by varying the temperature of the wavelength conversion element 308. Examples of nonlinear optical materials of the wavelength conversion element include magnesium-doped $LiNbO_3$, $LiTaO_3$, and $KTiOPO_4$. Also, stoichiometric $LiNbO_3$ and $LiTaO_3$, and magnesium-doped stoichiometric $LiNbO_3$ and $LiTaO_3$, are promising in terms of highly efficient conversion. Any wavelength conversion is possible, and highly efficient conversion can be performed, by varying the polarization inversion structure. Even higher conversion efficiency can be attained by using an optical waveguide structure.

A semiconductor laser of 980 nm is not the only semiconductor laser that can be used as the light source. If a semiconductor laser with a wavelength of 1060 nm is used, green light of 530 nm can be generated, and if a semiconductor laser of close to 900 nm is used, blue light can be generated. Furthermore, ultraviolet light can be generated by using a near infrared or red semiconductor laser of 780 or 680 nm. These semiconductor lasers have higher output and proven reliability, and various kinds of laser light source can be obtained by combining them with a wavelength conversion element.

In the constitution of the present invention, wavelength control needs to be performed to make the oscillation wavelength of the semiconductor laser match the phase matching wavelength of the wavelength conversion element. In the case of a band pass filter, since the reflecting face is a dichroic mirror, even if the band pass filter is rotated, the reflection wavelength will be fed back to the active layer of the semiconductor laser. Accordingly, the transmission wavelength can be varied with the angle of the band pass filter. Since the transmission wavelength can be varied by adjusting the angle of the band pass filter, the oscillation wavelength of the semiconductor laser can be controlled to match the phase matching wavelength by angle adjustment.

A case in which the wavelength conversion element was furnished with an optical waveguide was described in the above embodiment, but this constitution can also be applied with a bulk type of wavelength conversion element.

Third Embodiment

Here, we will describe a laser display as an example of an optical device that makes use of the coherent light source of the present invention.

With a laser display, a display of high color reproducibility can be achieved by using an RGB laser. High-output red semiconductor lasers have been developed as laser light sources. An increase in output has not been achieved with blue, however, and the very formation of a semiconductor laser is difficult with green. In view of this, it is necessary to use blue and green light sources that utilize wavelength conversion. In the coherent light source of the present invention, since a wide stripe semiconductor laser can be used, high-output blue and green light can be obtained by combining with a wavelength conversion element. For blue output, blue light of 440 nm can be obtained by subjecting a semiconductor laser of 880 nm to wavelength conversion, and for green output, green light of 530 nm can be obtained by subjecting a semiconductor laser of 1060 nm to wavelength conversion.

Figure 6:
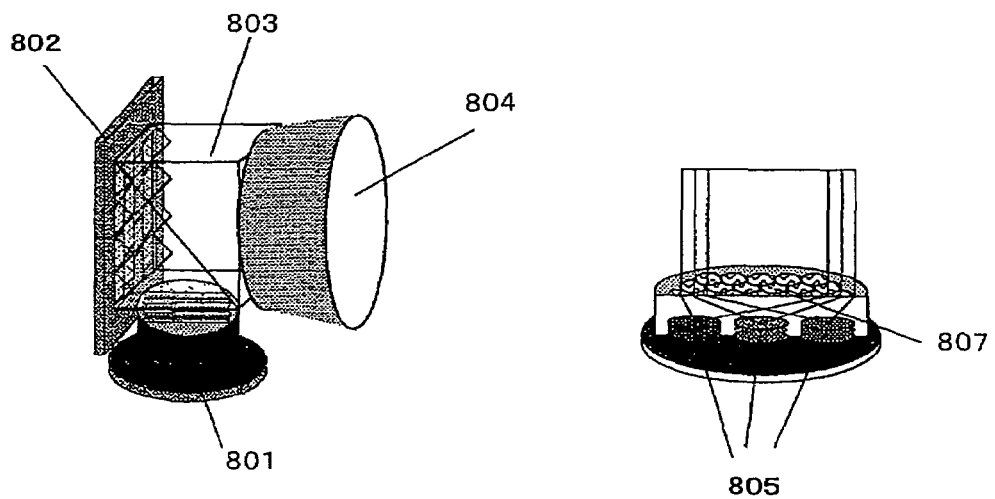
FIG. 6 is a diagram of the structure of the optical device pertaining to Embodiment 3 of the present invention.

A two-dimensional image can be projected by integrating these light sources, projecting onto a two-dimensional switch 802 through a prism 803, and projecting the switched light onto a screen with a lens 804 (FIG. 6). The two-dimensional switch 802 can be an MEMS involving micromachines, or a liquid crystal switch, or the like. While it varies with the screen size, the required output is from approximately a few dozen milliwatts to a few hundred milliwatts. As discussed above, the coherent light source of the present invention affords a compact short-wavelength light source, and allows a compact and highly efficient laser display to be obtained.

Figure 7:
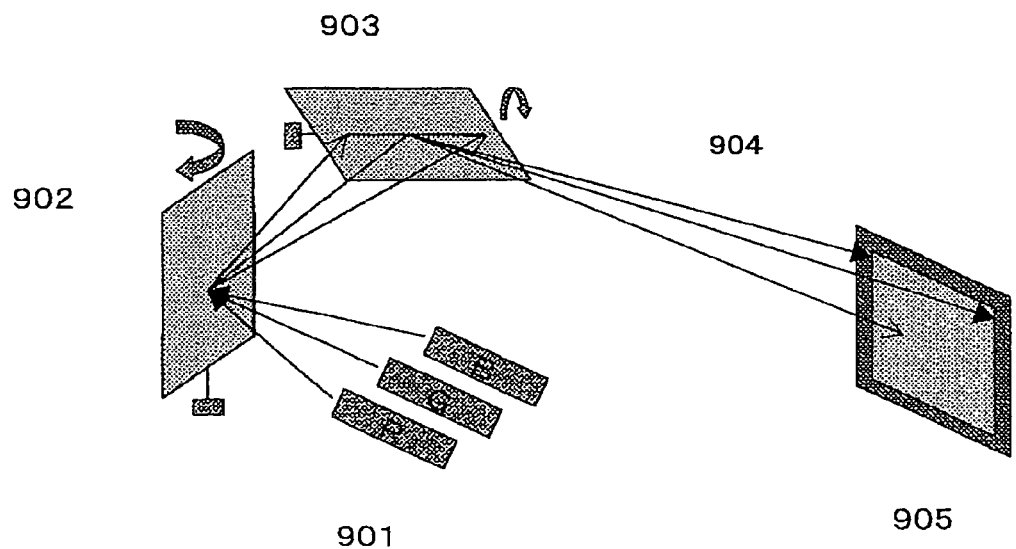
FIG. 7 is a diagram of another structure of the optical device pertaining to Embodiment 3 of the present invention.
Figure 8:
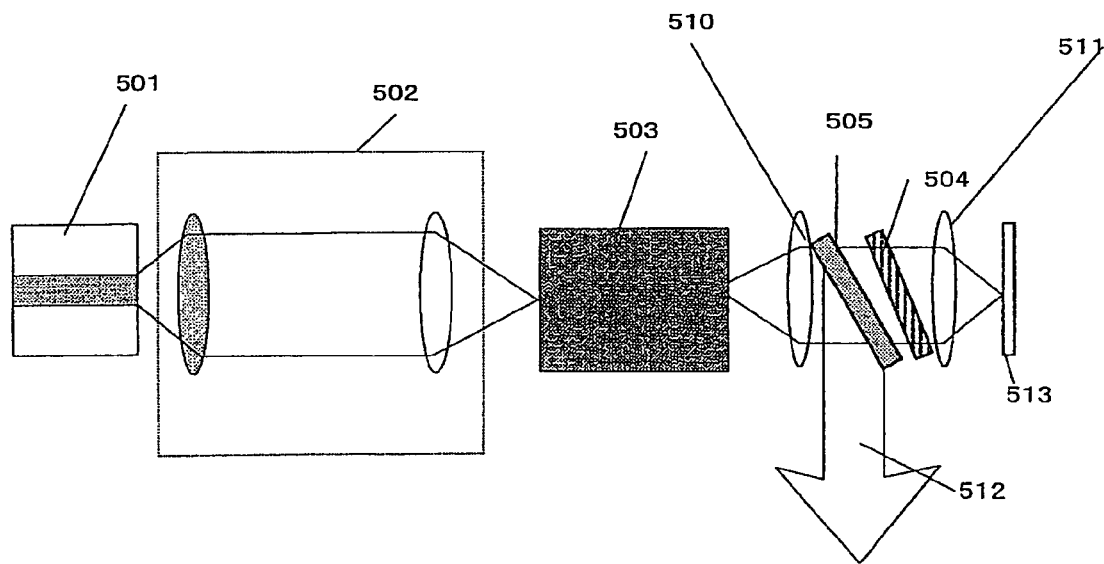
FIG. 8 is a diagram of the structure of a conventional coherent light source.

The system shown in FIG. 7 is also effective as a laser display device. A two-dimensional image is drawn on a screen by scanning a laser beam with mirrors 902 and 903. In this case, the laser light source must have a high-speed switching function, and high-speed output modulation is possible by modulating the output of the semiconductor laser. The coherent light source of the present invention allows for higher output and is promising in laser display applications. Also, even though it is a wide stripe laser involving optical feedback, since both the vertical mode and the lateral mode are fixed in single mode, output modulation of the laser can be performed at high speed. This allows a scanning type of laser display to be obtained.

Embodiments of the present invention were described above by giving examples of using an SHG element for a waveguide type of optical device. With a light source that makes use of an SHG element, since a high-output semiconductor laser is often used as the semiconductor laser, if a wide stripe semiconductor laser could be used as a high-output laser, a compact high-output light source could be achieved. Accordingly, using the structure of the present invention affords higher output and better stability.

The waveguide type of optical device is not limited to an SHG element, however. For example, various functions and constitutions are conceivable as the waveguide type of optical device, such as a high-speed modulation element, phase shifter, frequency shifter, or polarization control element. The waveguide type of optical device of the present invention can be applied to all optical systems that make use of a coherent light source and a waveguide type of optical device such as this.

Also, a laser display was described as an example of an optical device, but the present invention is also effective with optical disk devices and measurement devices. The present invention is particularly effective with an optical disk device, since it needs to have higher laser output through higher write speed. Because it has high output and high coherence, the light source of the present invention can be more compact, and is effective when applied to optical disks and the like.

INDUSTRIAL APPLICABILITY

As discussed above, the coherent light source of the present invention has a structure that is effect in the wavelength conversion of a semiconductor laser. In the wavelength conversion of a semiconductor laser, the wavelength of the semiconductor laser needs to be controlled by optical feedback in order to stabilize the output of the light source. To achieve optical feedback, the oscillation wavelength of the semiconductor laser is controlled by selecting the transmission wavelength of a band pass filter, using a narrow-band band pass filter. Here, if higher harmonic wave transmission characteristics are imparted to the band pass filter, the number of optical components will be reduced, and the optical system can be made more compact and stable. This affords a short-wavelength light source that has high output and is stable, and is extremely well suited to mass production.

Moreover, the coherent light source affords a high-output and a compact RGB light source, and allows it to be applied to various optical devices such as a laser display and an optical disk device.

The invention claimed is:

1. A coherent light source, comprising:
    a light source;
    a wavelength conversion element that converts part of a fundamental wave emitted from the light source into a higher harmonic wave; and
    a wavelength selecting filter that has narrow-band transmission characteristics with respect to the part of the fundamental wave not converted into the higher harmonic wave, and has transmission characteristics with respect to the higher harmonic wave,
    wherein the part of the fundamental wave emitted from the wavelength conversion element but not converted into the higher harmonic wave is fed back to the light source by the wavelength selecting filter,
    the higher harmonic wave is emitted to the outside after passing through the wavelength selecting filter,
    the wavelength selecting filter includes a mechanism to vary an angle with respect to the fundamental wave, thereby adjusting a transmitted wavelength, and
    $\Delta\lambda 2 > \lambda 1$ is satisfied, wherein $\Delta\lambda 1$ is a transmitted wavelength bandwidth for the fundamental wave in the wavelength selecting filter and $\Delta\lambda 2$ is a transmitted wavelength bandwidth for the higher harmonic wave in the wavelength selecting filter.

2. The coherent light source according to claim 1, wherein the wavelength selecting filter has a band pass filter and a dichroic mirror,
    the band pass filter has narrow-band transmission characteristics with respect to the part of the fundamental wave not converted into the higher harmonic wave, and has transmission characteristics with respect to the higher harmonic wave,
    the dichroic mirror reflects the part of the fundamental wave transmitted by the band pass filter but not converted into the higher harmonic wave, and
    the higher harmonic wave passes through the band pass filter and then passes through the dichroic mirror and is emitted to the outside.

3. The coherent light source according to claim 2, wherein the wavelength selecting filter is a confocal optical system, and
    the dichroic mirror is installed in the focal plane of the confocal optical system.

4. The coherent light source according to claim 1, wherein the light source is a single-mode semiconductor laser.

5. The coherent light source according to claim 4, wherein the cavity length of the semiconductor laser is 1 mm or more.

6. The coherent light source according to claim 4, wherein the semiconductor laser has undergone high-frequency superposition.

7. The coherent light source according to claim 1, wherein the light source is a fiber laser.

8. The coherent light source according to claim 1, wherein the transmissivity of the higher harmonic wave of the wavelength selecting filter is 80% or more.

9. The coherent light source according to claim 1, wherein the selected wavelength width of the wavelength selecting filter is 0.2 nm or less.

10. The coherent light source according to claim 1, wherein the wavelength conversion element is furnished with a periodic polarization inversion structure.

11. The coherent light source according to claim 1, wherein at least one of the end faces of the wavelength conversion element is inclined at an angle of 3 or more with respect to the optical axis of the wavelength conversion element.

12. The coherent light source according to claim 1, further comprising a focusing optical system between the light source and the wavelength conversion element,
    wherein the focusing optical system has chromatic aberration, and focuses the higher harmonic wave and the part of the fundamental wave not converted to the higher harmonic wave at different focal points.

13. The coherent light source according to claim 1, wherein the wavelength conversion element includes an optical waveguide.

14. The coherent light source according to claim 13, wherein the wavelength conversion element is directly coupled to the light source.

15. The coherent light source according to claim 13, wherein the wavelength selecting filter is installed on an end face or in the interior of the optical waveguide.

16. The coherent light source according to claim 1, wherein the wavelength conversion element includes an optical waveguide,
- the wavelength selecting filter has a band pass filter installed on an end face or in the interior of the optical waveguide, and a dichroic mirror installed on an end face of the optical waveguide,
- the band pass filter has narrow-band transmission characteristics with respect to the part of the fundamental wave not converted into the higher harmonic wave, and has transmission characteristics with respect to the higher harmonic wave,
- the dichroic mirror reflects the part of the fundamental wave transmitted by the band pass filter but not converted into the higher harmonic wave, and
- the higher harmonic wave passes through the band pass filter and then passes through the dichroic mirror and is emitted to the outside.

17. The coherent light source according to claim 16, wherein the thickness of the dichroic mirror is 1 mm or more.

18. An optical device, having an image conversion optical system and the coherent light source according to claim 1, wherein the light from the coherent light source is converted into a two-dimensional image by the optical system.

19. The optical device according to claim 18, wherein the image conversion optical system comprises a two-dimensional beam scanning optical system.

20. The optical device according to claim 18, wherein the image conversion optical system comprises a two-dimensional switch.

21. The coherent light source according to claim 1, wherein $\Delta\lambda_1 < 0.6$ nm and $\Delta\lambda_2 > 10$ nm.

* * * * *

UNITED STATES PATENT AND TRADEMARK OFFICE
CERTIFICATE OF CORRECTION

PATENT NO. : 7,426,223 B2
APPLICATION NO. : 10/576210
DATED : September 16, 2008
INVENTOR(S) : Kiminori Mizuuchi Page 1 of 1

It is certified that error appears in the above-identified patent and that said Letters Patent is hereby corrected as shown below:

On the Title Page

On page 1, right column, in item (56), References Cited, under Foreign Patent Documents, line 15, "EP 0 709 649" should read --EP 0 703 649--.

In column 12, claim 1, line 4, "$\Delta\lambda 2 > \lambda 1$" should read --$\Delta\lambda 2 > \Delta\lambda 1$--.

Signed and Sealed this

Twenty-second Day of September, 2009

David J. Kappos
*Director of the United States Patent and Trademark Office*